United States Patent
Suh

(10) Patent No.: US 8,776,630 B2
(45) Date of Patent: Jul. 15, 2014

(54) OPERATING SHIFT APPARATUS FOR TRANSMISSION

(75) Inventor: Hongsuk Suh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 294 days.

(21) Appl. No.: 13/315,168

(22) Filed: Dec. 8, 2011

(65) Prior Publication Data

US 2013/0036849 A1     Feb. 14, 2013

(30) Foreign Application Priority Data

Aug. 11, 2011   (KR) ......................... 10-2011-0080323

(51) Int. Cl.
*F16H 63/30*     (2006.01)

(52) U.S. Cl.
USPC ................. 74/473.1; 74/473.21; 74/473.29

(58) Field of Classification Search
USPC ............ 74/473.1, 473.18, 473.21, 473.23, 74/473.24, 473.25, 473.26, 473.29, 473.36
See application file for complete search history.

(56) References Cited

U.S. PATENT DOCUMENTS

| | | | |
|---|---|---|---|
| 5,768,944 A * | 6/1998 | Inuzuka et al. ............... | 74/473.1 |
| 6,892,600 B2 | 5/2005 | Onuma et al. | |
| 8,459,137 B1 * | 6/2013 | McCoy et al. ............... | 74/473.29 |
| 2004/0221675 A1 * | 11/2004 | Kramer et al. ............... | 74/473.1 |
| 2006/0169083 A1 * | 8/2006 | Matsuda ....................... | 74/473.1 |
| 2006/0207372 A1 * | 9/2006 | Mochizuki ................... | 74/473.1 |
| 2006/0266147 A1 * | 11/2006 | Bowen et al. ................ | 74/473.1 |
| 2007/0137356 A1 * | 6/2007 | Itoh et al. ..................... | 74/473.1 |
| 2007/0193385 A1 * | 8/2007 | Hermansson et al. ....... | 74/473.1 |
| 2007/0214907 A1 * | 9/2007 | Kato et al. .................... | 74/473.1 |
| 2008/0041180 A1 * | 2/2008 | Cho ............................. | 74/473.1 |
| 2008/0053261 A1 * | 3/2008 | Wright ........................ | 74/473.11 |
| 2008/0098841 A1 * | 5/2008 | Vermeersch ................. | 74/473.1 |
| 2008/0098845 A1 * | 5/2008 | Meyer ......................... | 74/473.26 |

FOREIGN PATENT DOCUMENTS

| | | |
|---|---|---|
| JP | 2000-027990 | 1/2000 |
| JP | 2003-106449 A | 4/2003 |
| KR | 10-0368650 | 1/2003 |

* cited by examiner

*Primary Examiner* — David M Fenstermacher
(74) *Attorney, Agent, or Firm* — Morgan, Lewis & Bockius LLP

(57) ABSTRACT

An operating shift apparatus for a transmission may improve shift feeling using variable rotational inertia according to rotation. The operating shift apparatus for a transmission may include a control shaft is disposed on a transmission case, a select lever which is connected to the control shaft and selects a shift gear, a shift lever which is connected to the control shaft and engages the selected shift gear and a weight disposed to the shift lever for enhancing rotational inertia of the shift lever, wherein the shift lever and the weight are independently formed.

12 Claims, 3 Drawing Sheets

OPERATING SHIFT APPARATUS FOR TRANSMISSION

CROSS-REFERENCE TO RELATED APPLICATION

The present application claims the priority of Korean Patent Application Number 10-2011-0080323 filed Aug. 11, 2011, the entire contents of which application is incorporated herein for all purposes by this reference.

BACKGROUND OF INVENTION

1. Field of Invention

The present invention relates to an operating shift apparatus for a transmission. More particularly, the present invention relates to an operating shift apparatus for a transmission which may improve shift feeling using variable rotational inertia according to rotation.

2. Description of Related Art

Generally a transmission is disposed between a clutch of a vehicle and a drive shaft for receiving rotational speed of an engine and shifting the rotational speed. Particularly, an operating shift apparatus is mounted to a manual transmission for a driver to manipulate the transmission according to running state of a vehicle.

The operating shift apparatus is connected to a shift lever through a control cable and allows manipulating operation of a transmission. The operating shift apparatus includes a select lever selecting shift gears and a shift lever engaging the selected shift gear a control shaft operated by the select lever and the shift lever.

A weight is integrally formed to the shift lever. And thus, mass of the weight may increase rotational inertia when the shift lever rotates, so that shift feeling may be improved.

However, the shift lever and the weight are integrally formed, and thus constant rotational inertia may be realized relationless shift stages. That is, when weight and position of the weight is determined, constant rotational inertia is determined. And thus, shift characteristic, according to shift stages or kind of a vehicle, may not be reflected according. Also, alteration of position of the weight may be limited and thus rotational inertia is proportional to weight of the weight.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an operating shift apparatus which may vary rotational inertia of a shift lever.

Also, the present invention has been made in an effort to provide an operating shift apparatus which may reduce total weight of the apparatus.

An operating shift apparatus for a transmission of which a control shaft is disposed to a transmission case, the operating shaft apparatus according to various aspects of the present invention may include a select lever which is connected to the control shaft and selects a shift gear, a shift lever which is connected to the control shaft and engages the selected shift gear and a weight disposed to the shift lever for enhancing rotational inertia of the shift lever, wherein the shift lever and the weight are independently formed.

The shift lever may rotate on the control shaft integral with the control shaft.

The weight may rotate dependently according to rotation of the shift lever.

The weight and the shift lever may rotate on different rotation axis and each may have different angle of rotation.

The rotation axis of the weight may be formed to a predetermined position of the transmission case.

Ratio of the angles of rotation of the shift lever and the weight may be variable according to the rotation axis of the weight.

The operating shaft apparatus may further include an extended portion protruded from the shift lever and a guide hole formed to the extended portion.

A connecting protrusion, inserted into the guide hole, may be formed to the weight.

The connecting protrusion may be slidably movable within the guide hole for the weight easily to rotate dependently according to rotation of the shift lever.

Ratio of the angles of rotation of the shift lever and the weight may be variable according to shape of the extended portion and position of the guide hole.

The operating shaft apparatus may further include an extended portion protruded from the shift lever and a connecting protrusion formed to the extended portion.

A guide hole may be formed to the weight for the connecting protrusion to be inserted therein.

The connecting protrusion may be slidably movable within the guide hole for the weight easily to rotate dependently according to rotation of the shift lever.

Ratio of the angles of rotation of the shift lever and the weight may be variable according to shape of the extended portion and position of the connecting protrusion.

Relative rotation angle of the weight may be gradually reduced during the shift lever rotates for realizing shift.

The rotational inertia of the shift lever may be gradually reduced during the relative rotation angle of the weight is gradually reduced.

According to various aspects of the present invention, in rotation of a shift lever, relatively small weight may realize relatively large rotational inertia using lever ration of the shift lever and weight. And thus, total weight of the apparatus may be reduced.

The lever ratio may be variable according to rotation of the shift lever and weight. And thus the rotational inertia of the shift lever may be changed during shift stage. And thus, driver' shift feeling may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
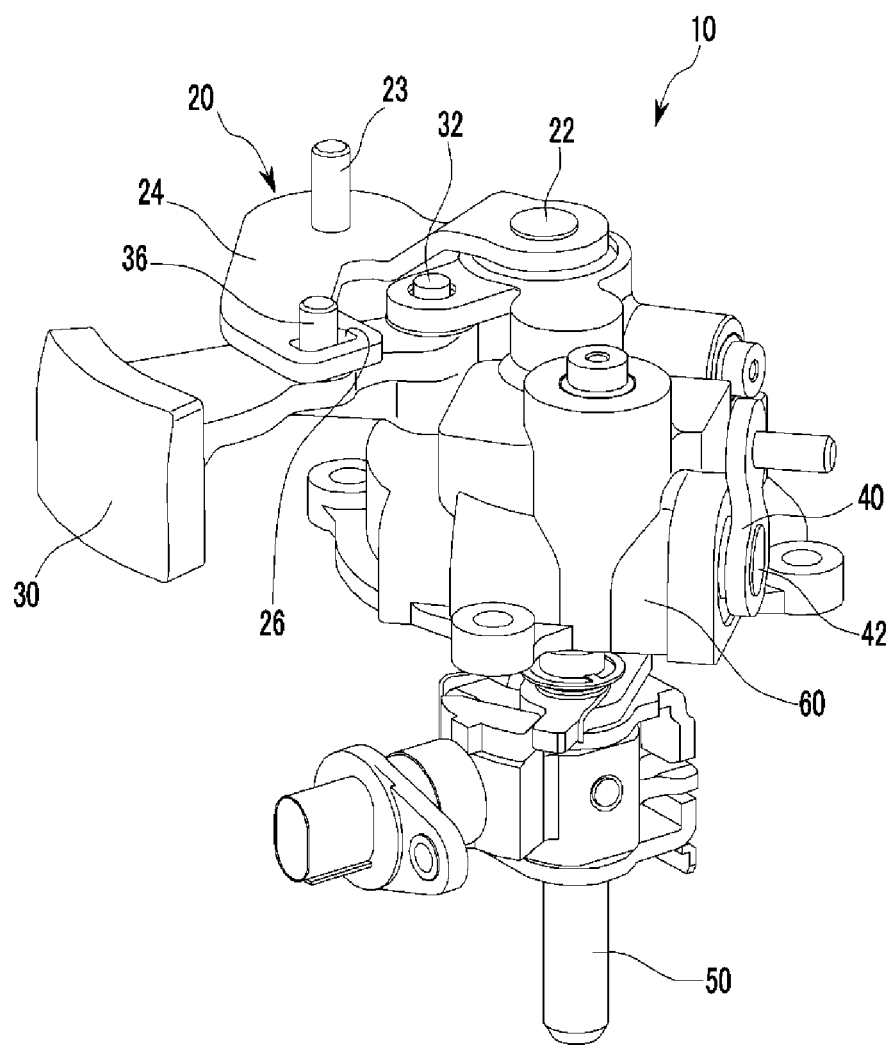
FIG. 1 is a perspective view of an operating shift apparatus for an exemplary transmission according to the present invention.

FIG. 1 is a perspective view of an operating shift apparatus for a transmission according to various embodiments of the present invention.

As shown in FIG. 1, an operating shift apparatus 10 for a transmission according to various embodiments of the present invention includes a control shaft 50, a transmission case 60, a select lever 40, a shift lever 20 and a weight 30.

The control shaft 50 is mounted to the transmission case 60 and connected with the select lever 40 and the shift lever 20. That is, the control shaft 50 is connected with the select lever 40 and the shift lever 20 within the transmission case 60 and realizes selecting shift gears and engages the shift gears.

The select lever 40 is connected with the control shaft 50 and selects shift gears and the shift lever 20 is connected with the control shaft 50 and engages the shift gears. The select lever 40 and the shift lever 20 are connected with a manual lever, of which a driver manipulates, through a control cable.

A select lever rotating shaft 42 may be vertical to the control shaft 50. And thus, when the select lever 40 rotates, the control shaft 50 or parts of the control shaft 50 moves along length direction of the control shaft 50. A shift lever rotating shaft 22 may rotate on the control shaft 50. And thus, the shift lever 20 may rotate integrally with the control shaft 50 around the control shaft 50. Relationship and construction of the select lever 40, the shift lever 20 and the control shaft 50 are obvious to a person skilled in the art, and thus detailed description will be omitted.

The shift lever 20 includes the shift lever rotating shaft 22, a cable protrusion 23, an extended portion 24 and a guide hole 26.

The shift lever rotating shaft 22 is connected to the control shaft 50. That is, the shift lever rotating shaft 22 is coincide with shaft center of the control shaft 50 or connected with the control shaft 50 to rotate the control shaft 50.

The cable protrusion 23 is formed to a predetermined position of the shift lever 20 for connecting the shift lever 20 with a manual lever, of which a driver manipulate, through a control cable. The cable protrusion 23 is protruded from the shift lever 20 for connecting the cable.

The extended portion 24 may be integral to, and or monolitically formed with the shift lever 20 or may be formed for rotating with the shift lever 20 integrally. The extended portion 24 may be protruded parallel to rotating direction of the shift lever 20. In FIG. 1, the extended portion 24 is formed as a plate, but it's shape is not limited as shown.

The guide hole 26 is formed to the extended portion 24 for connecting the shift lever 20 with the weight 30.

The weight 30 includes a weight rotating shaft 32 and a connecting protrusion 36.

The weight rotating shaft 32 is formed to the weight 30 and connected to a predetermined position of the transmission case 60 or the weight rotating shaft 32 is formed to a predetermined position of the transmission case 60 and is connected to the weight 30. That is, rotation center of the weight 30 is different of that of the shift lever 20.

The connecting protrusion 36 is formed to the weight 30 and is inserted into the guide hole 26. That is, the shift lever 20 the weight 30 are connected by the connecting protrusion 36 and the guide hole 26. The weight 30 rotates dependently to rotation of the shift lever 20. The connecting protrusion 36 is slidably movable within the guide hole 26 for the weight 30 easily to rotate dependently according to rotation of the shift lever 20. That is, the guide hole 26 is formed to allow the connecting protrusion 36 moving within the guide hole 26 in predetermined distance.

While the guide hole 26 is formed to the extended portion 24 and the connecting protrusion 36 is formed to the weight 30 in FIG. 1, however the connecting protrusion 36 may be formed to the extended portion 24 and the guide hole 26 may be formed to the weight 30.

Figure 2:
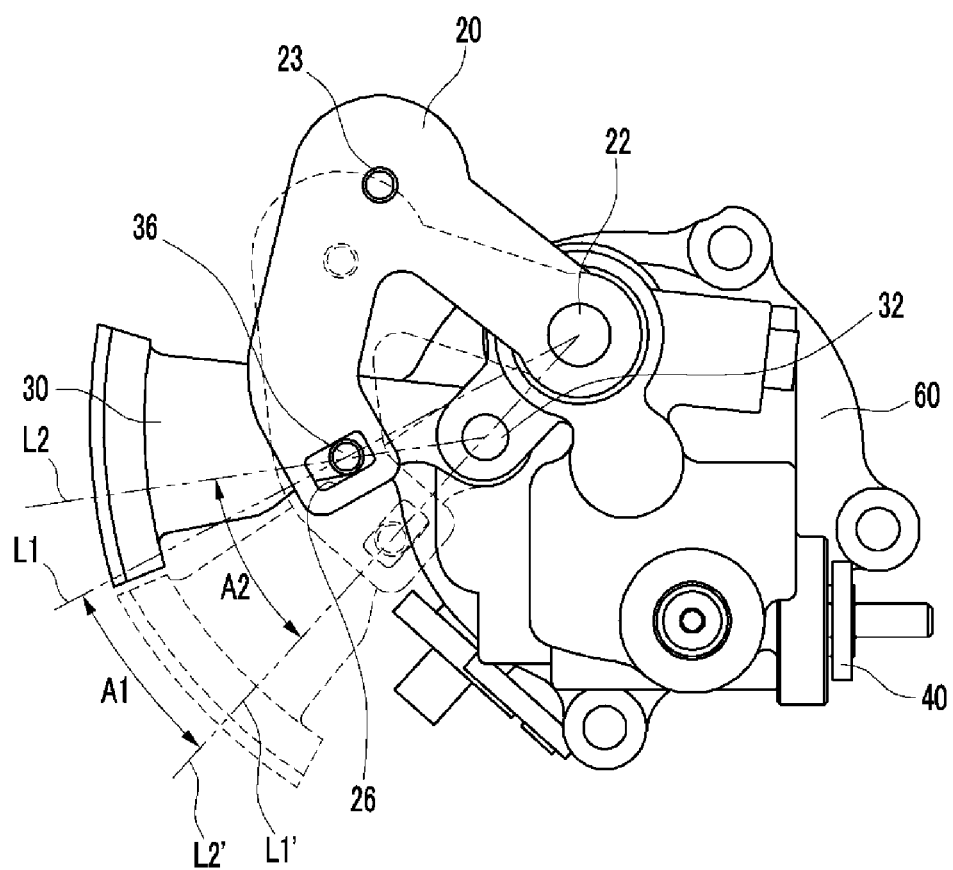
FIG. 2 is a top plan view of an operating shift apparatus for an exemplary transmission according to the present invention.

FIG. 2 is a top plan view of an operating shift apparatus for a transmission according to various embodiments of the present invention.

As shown in FIG. 2, the shift lever 20 and the weight 30 rotate simultaneously with each different rotation angle.

The cable protrusion 23 rotates on the shift lever rotating shaft 22 and the connecting protrusion 36 rotates on the weight rotating shaft 32. The cable protrusion 23 and the connecting protrusion 36 are separated each other in predetermined distance.

Rotation centers of the shift lever 20 and the weight 30 are not equal, and the cable protrusion 23 and the connecting protrusion 36 are separated, and thus ratio of the angles of rotation of the shift lever 20 and the weight 30 are variable. The ratio of the angles of rotation of the shift lever 20 and the weight 30 may be lever ratio of the shift lever 20 and the weight 30 and the rotational inertia of the shift lever 20 may be variable according to the lever ratio.

The lever ratio may be variable according to distance between the cable protrusion 23 and the connecting protrusion 36 and distance between the shift lever rotating shaft 22 and the weight rotating shaft 32. That is, the lever ratio may be changed according to shape of the extended portion 24 and position of the guide hole 26, and position of the weight rotating shaft 32.

In FIG. 2, L1 and L1' denote lines connecting the shift lever rotating shaft 22 and the connecting protrusion 36 before and after moving and A1 denotes angle between the L1 and L1'. That is, the A1 denotes rotation angle of the shift lever 20. L2 and L2' denote lines connecting the weight rotating shaft 32 and the connecting protrusion 36 before and after moving and A2 denotes angle between the L2 and L2'. That is, the A2 denotes rotation angle of the weight 30. In this case, the lever ratio between the shift lever 20 and the weight 30 is shift lever rotation angle A1: weight rotation angle A2.

In FIG. 2, for easy comprehension of the lever ratio of "shift lever rotation angle A1: weight rotation angle A", L1' and L2' are identically drawn when the shift lever rotating shaft 22, the weight rotating shaft 32 and the connecting protrusion 36 are on the same line.

Figure 3:
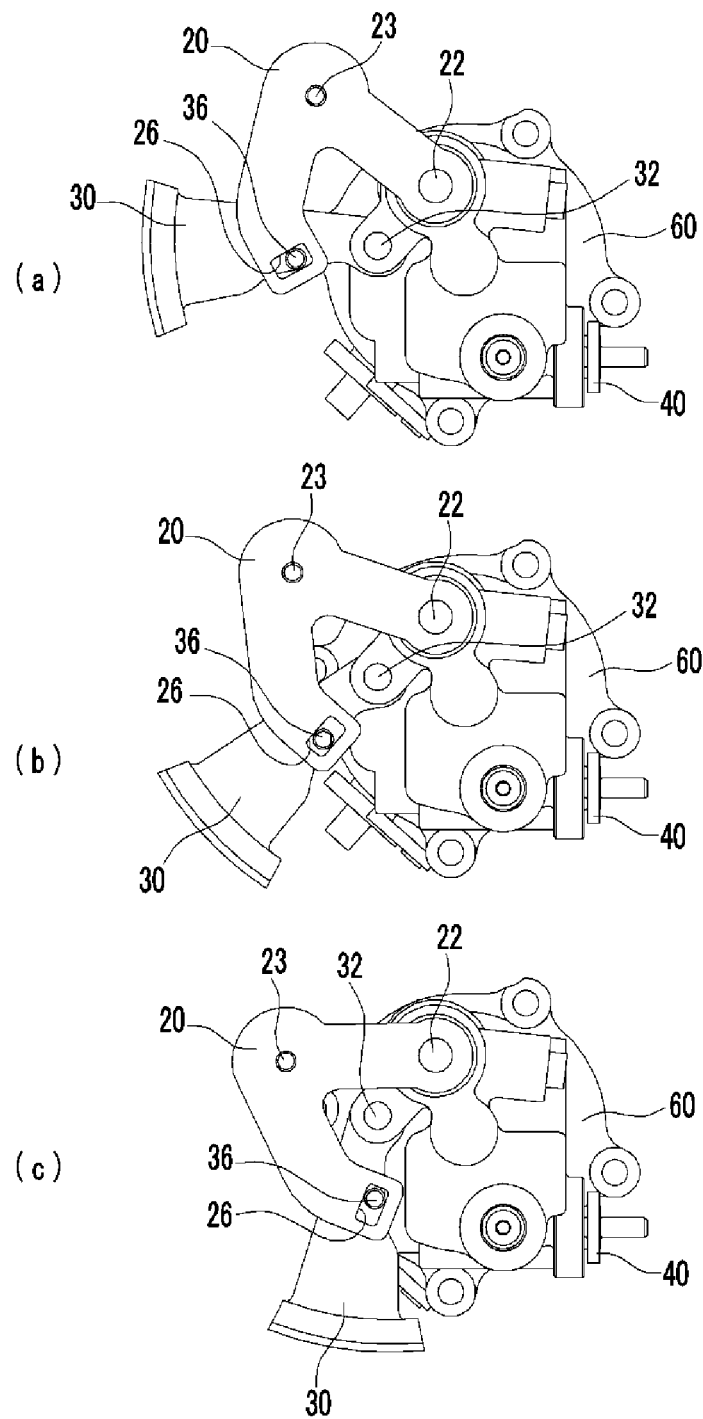
FIG. 3 is a drawing showing each stage of rotation operation of an operating shift apparatus for an exemplary transmission according to the present invention.

FIG. 3 is a drawing showing each stage of rotation operation of an operating shift apparatus for a transmission according to various embodiments of the present invention.

As shown in FIG. 3, the connecting protrusion 36 may be movable within the guide hole 26 according to rotation of the shift lever 20 and the guide hole 26 is formed for allowing weight 30 to dependently rotate according to rotation of the shift lever 20.

In FIG. 3, while exact rotation angle and the rotation ratio are not expressed, however the lever ratio between operation of the operating shift apparatus 10 from (a) to (b) of FIG. 3 and from (b) to (c) of FIG. 3 may be different. In detail, when the shift lever 20 rotates anticlockwise direction of the drawing, the lever ratio gradually reduced. That is, the lever ratio is gradually reduced at last phase of the shift operation. The rotational inertia at last stage of the shift operation is reduced comparing the early of the of the shift operation. In the FIG. 3, while operation of the operating shift apparatus 10 are expressed as 3 stages for easy comprehension, it is not limited thereto.

As described above, according to various embodiments of the present invention, in rotation of a shift lever, relatively small weight may realize relatively large rotational inertia using lever ration of the shift lever and weight. And thus, total weight of the apparatus may be reduced. The lever ratio may be variable according to rotation of the shift lever 20. The rotational inertia at last stage of the shift operation is reduced comparing the early of the of the shift operation. And thus, impact and noise at last stage of the shift operation may be reduced by gradually reducing rotational inertia.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operating shift apparatus for a transmission having a control shaft disposed on a transmission case, the operating shaft apparatus comprising:
   a select lever which is connected to the control shaft and selects a shift gear;
   a shift lever which is connected to the control shaft and engages the selected shift gear; and
   a weight disposed on the shift lever for enhancing rotational inertia of the shift lever,
   wherein the shift lever and the weight are independently formed;
   wherein the shift lever rotates on the control shaft integrally with the control shaft;
   wherein the weight rotates dependent upon rotation of the shift lever; and
   wherein the weight and the shift lever rotate on different rotation axes and have different angles of rotation.

2. The operating shaft apparatus of claim 1, wherein the rotation axis of the weight is formed at a predetermined position of the transmission case.

3. The operating shaft apparatus of claim 2, wherein ratio of the angles of rotation of the shift lever and the weight are variable according to the rotation axis of the weight.

4. The operating shaft apparatus of claim 1, wherein the operating shaft apparatus further comprises:
   an extended portion protruding from the shift lever; and
   a guide hole formed at the extended portion.

5. The operating shaft apparatus of claim 4, wherein a connecting protrusion adjacent the weight extends into the guide hole.

6. The operating shaft apparatus of claim 5, wherein the connecting protrusion is slidably movable within the guide hole allowing the weight to rotate dependent upon rotation of the shift lever.

7. The operating shaft apparatus of claim 6, wherein ratio of the angles of rotation of the shift lever and the weight are variable according to shape of the extended portion and position of the guide hole.

8. The operating shaft apparatus of claim 1, wherein the operating shaft apparatus further comprises:
   an extended portion protruding from the shift lever; and
   a connecting protrusion formed to the extended portion.

9. The operating shaft apparatus of claim 8, wherein a guide hole is formed on the weight for receiving the connecting protrusion therein.

10. The operating shaft apparatus of claim 9, wherein the connecting protrusion is slidably movable within the guide hole allowing the weight to rotate dependent upon rotation of the shift lever.

11. The operating shaft apparatus of claim 10, wherein ratio of the angles of rotation of the shift lever and the weight are variable according to shape of the extended portion and the position of the connecting protrusion.

12. The operating shaft apparatus of claim 1, wherein relative rotation angle of the weight is reduced during the shift lever rotates for realizing shift.

* * * * *